UNITED STATES PATENT OFFICE.

DANIEL D. SMITH, OF LOUISVILLE, KENTUCKY, ASSIGNOR OF ONE-HALF HIS RIGHT TO CYRENE SMITH, OF SAME PLACE.

IMPROVEMENT IN DUMPING-WAGONS.

Specification forming part of Letters Patent No. 142,049, dated August 19, 1873; application filed April 3, 1873.

*To all whom it may concern:*

Be it known that I, DANIEL D. SMITH, of Louisville, in the county of Jefferson and in the State of Kentucky, have invented new and useful Improvements in Dumping-Wagons; and do hereby declare that the following is a full, clear, and exact description thereof, reference being had to the accompanying drawings and to the letters of reference marked thereon making a part of this specification.

My present invention is intended as an improvement on the dumping-wagon for which Letters Patent No. 130,950 were granted to me August 27, 1872; and it consists in the timber under each side of the bed being made in two parts with hinge in the center, the front end fastened to the fifth-wheel and the rear half fastened to the wagon-bed, and in the slides on the hounds of the hind axle and guides on the front half of the timbers under the bed, by which means the bed is kept straight while being backed over the rollers on the hind axle or drawn forward, all of which are combined and used, as will be hereinafter more fully set forth.

In order to enable others skilled in the art to which my invention appertains to make and use the same, I will now proceed to describe its construction and operation, referring to the annexed drawings, in which—

Figure 1:
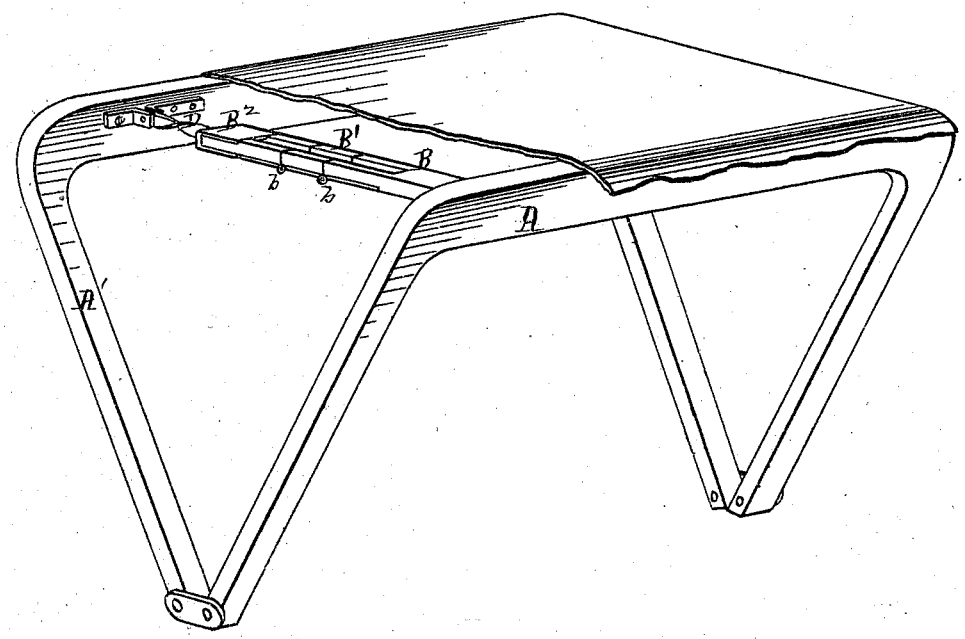
Figure 2:
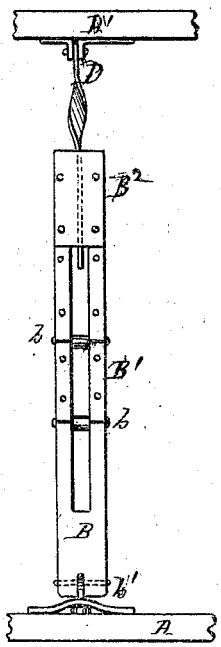
Figure 3:
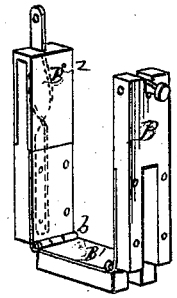

Figure 1 is a side elevation, Fig. 2 a plan view, and Fig. 3 a perspective view, of my improved dumping-wagon.

A represents the wagon box or bed, under each side of which is a timber made in two parts, B and B', and extending the entire length of the bed. The two parts B and B' of each timber are hinged together in the center at *a*. The front ends B B of the two timbers are connected by the foot-board C and are secured to the upper part of the fifth-wheel D, while the rear parts B' B' of the two timbers are permanently secured to the wagon-bed A. E E represent the rear hounds, on the sides of which are pivoted slides *b b*, which fit over and move on guides or ways *d d* attached to or formed on the inner sides of the parts B B of the bed-timbers, as shown fully in Fig. 3. The wagon-bed A rests, at its rear end, on rollers *e e* on the hind-axle G, as described in my former patent above referred to, and as the bed is backed over or drawn forward on said rollers the slides *b b*, moving on the guides *d d*, keep the bed straight. The slides being pivoted to the rear hounds admits of their accommodating themselves to the position of the front parts of the bed-timbers under any and all circumstances.

Having thus fully described my invention, what I claim as new, and desire to secure by Letters Patent, is—

The combination of the timbers B B' hinged together, the front part B fastened to the fifth-wheel, the rear part B' secured to the box A, slides *b b* pivoted on the rear hounds E E, and the guides *d d* formed on or attached to the parts B B, all substantially as and for the purposes herein set forth.

In testimony that I claim the foregoing I have hereunto set my hand this 13th day of March, 1873.

DANIEL D. SMITH.

JOHN MCCARTHY,
GEO. D. MAYLE,
ORANGE WEST.

J. H. SNYDER.
Carriage-Tops.

No. 142,050.                                Patented August 19, 1873.

Witnesses
Alex Mahon
N B Smith

Inventor
J. H. Snyder
G. W. Ford, Attorney
by A. M. Smith
Associate